United States Patent

[11] 3,549,173

| [72] | Inventor | Harry M. Stanfield<br>8827 Inwood Road, Dallas, Tex. 75209 |
|---|---|---|
| [21] | Appl. No. | 794,934 |
| [22] | Filed | Jan. 29, 1969 |
| [45] | Patented | Dec. 22, 1970 |

[54] SAFETY TRAILER DEVICE
12 Claims, 7 Drawing Figs.

[52] U.S. Cl. ................................................ 280/457, 280/511
[51] Int. Cl. ........................................... B60d 1/12
[50] Field of Search ................................. 280/457, 461, 497, 415.1, 515, 504, 511

[56] References Cited
UNITED STATES PATENTS

| 859,979 | 7/1907 | Sanker | 280/515X |
| 2,522,215 | 9/1950 | Dushane | 280/515 |
| 3,326,576 | 6/1967 | Kothmann | 280/457 |
| 3,393,924 | 7/1968 | Silver | 280/461 |
| 2,697,618 | 12/1954 | Hulstedt | 280/515 |

FOREIGN PATENTS

| 560,939 | 10/1956 | Italy | 280/457 |
| 602,485 | 3/1960 | Italy | 280/457 |

*Primary Examiner*—Benjamin Hersh
*Assistant Examiner*—Robert R. Song
*Attorney*—Howard E. Moore ABSTRACT: A safety trailer device having alternate connections between the motor vehicle and the towed vehicle comprising a channel member with aligned apertures in opposite ends thereof such that a ball connector may be mounted in the lower end and a safety connector may be secured to the other end vertically above the ball connector.

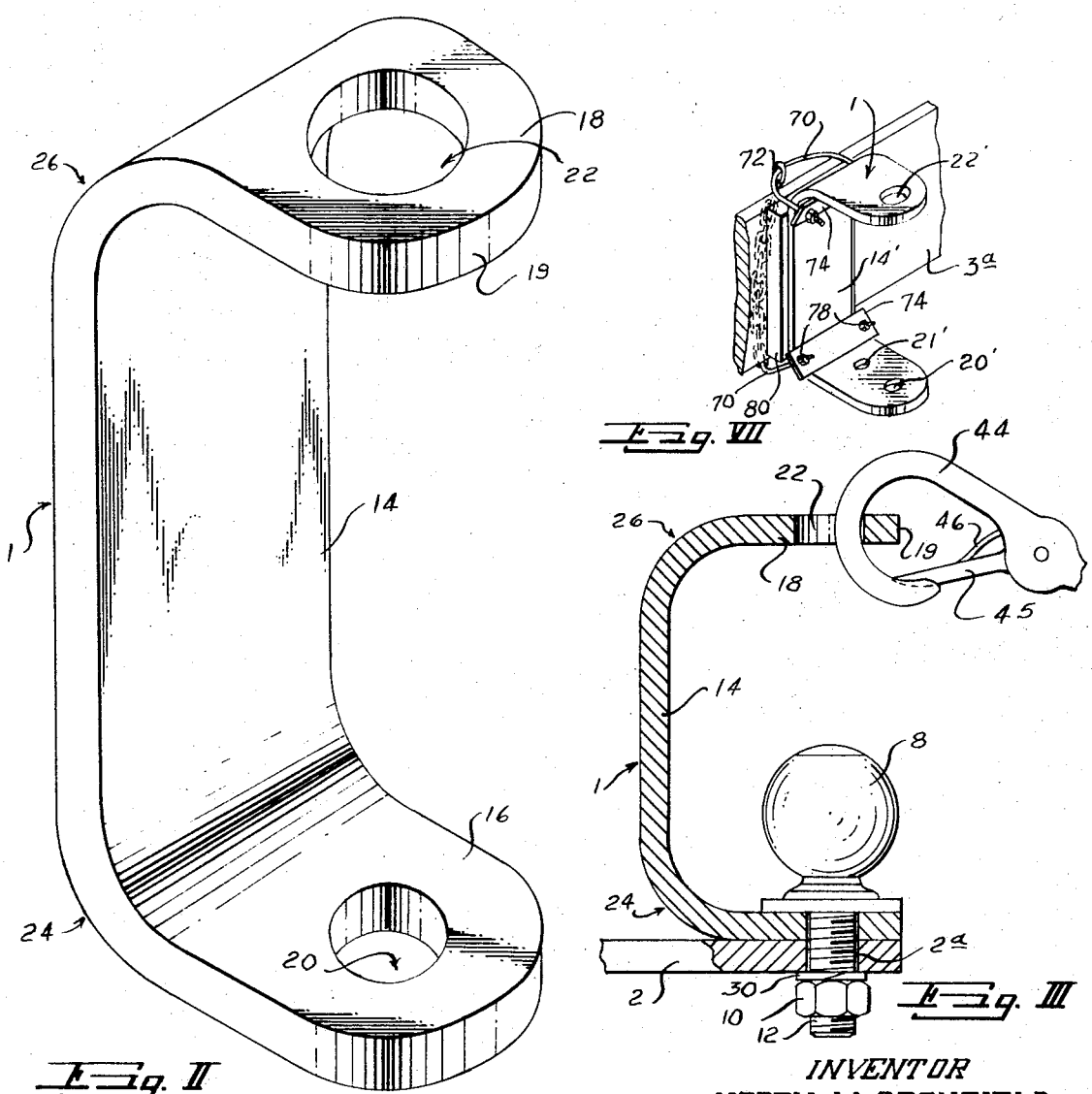

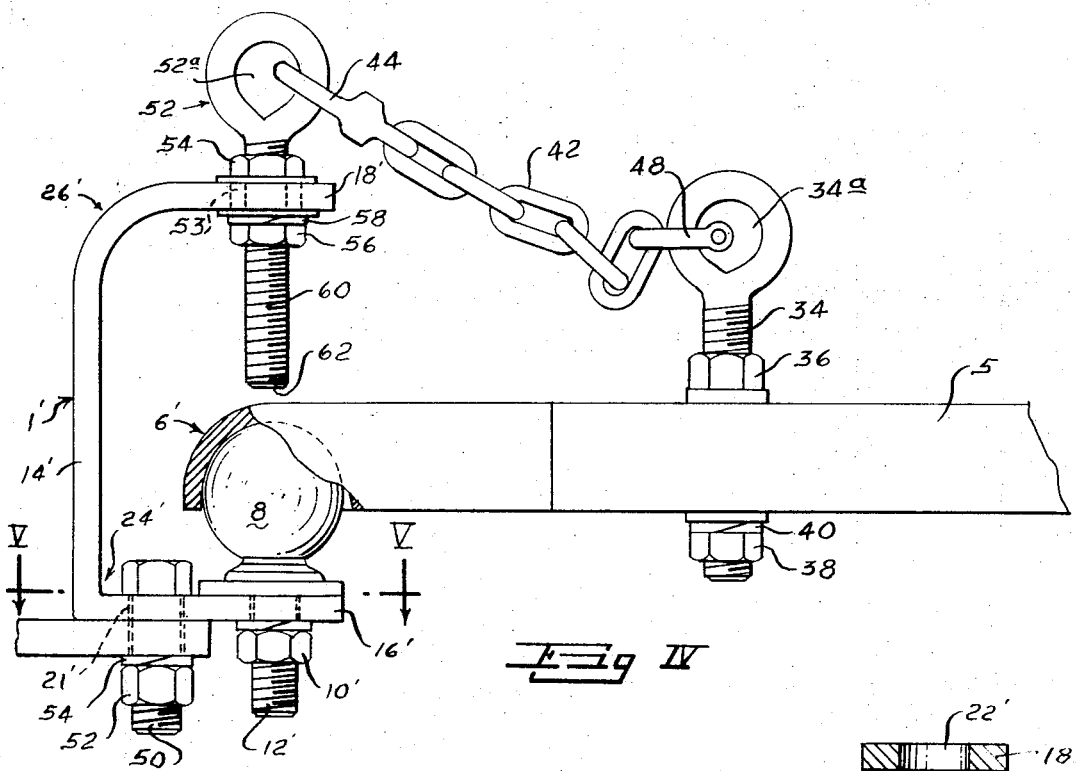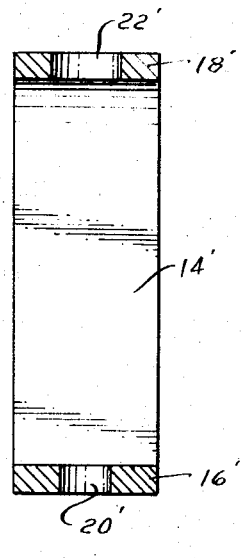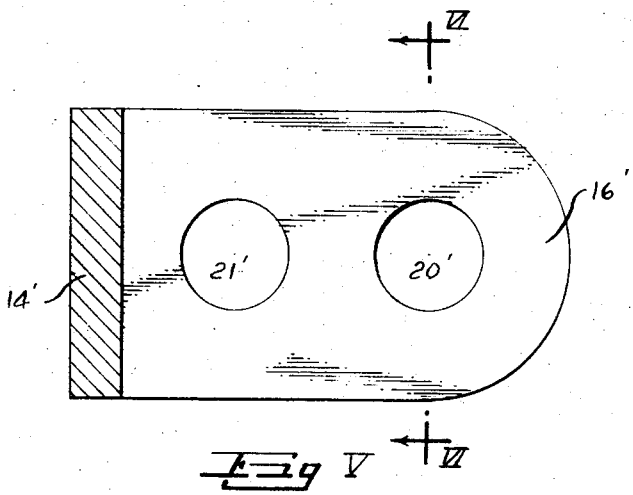

SAFETY TRAILER DEVICE

BACKGROUND OF INVENTION

Liability for damage resulting from a collision between a vehicle towing a trailer and another motor vehicle often requires a consideration of the degree of care exercised by the driver of the motor vehicle towing the trailer. Frequently, such a collision occurs as the result of the detachment of the trailer from the vehicle towing it. In such cases, liability is dependent upon the degree of care with which the trailer was attached to the vehicle.

The most common and well-known means for attaching trailers to motor vehicles consists of a ball connected to a towbar on the vehicle which is received and pivotally secured in a socket mounted on the front end of the trailer tongue. The ball is normally held in the socket by retractable locking means engaging the lower half of the ball to prevent removal of the socket from around the ball until the locking means is retracted.

Locking means utilized for securing the ball in the socket usually consists of a screw which may be rotated for moving a locking member toward the ball.

Vibration may cause a locking device to loosen allowing the socket to be disconnected from the ball. As a result of the positioning of the motor vehicle relative to the trailer while the trailer is being connected, it is often possible to screw the locking means down tight without adequately securing the ball in the socket after the vehicle moves relieving the strain on the connection.

Therefore, it is necessary to check the trailer hitch frequently to assure that the original connection was properly made and that the locking means has not loosened as a result of vibration.

In view of the danger of trailers becoming detached from the motor vehicle, most municipal governments require some sort of auxiliary safety attachment when a trailer is being towed.

Heretofore, it has been common practice to attach a loosely hung chain from the trailer tongue to some place on the rear of the towing vehicle for the purpose of keeping the trailer connected to the towing vehicle should the hitch break loose or become disconnected. This method of auxiliary fastening lacks safety and satisfaction for a number of reasons.

If the chain is long enough to allow a 90° turn, it is necessary that the chain hang in a slack position. This creates a hazard because of the danger that the chain may hang on objects in the roadway. If the chain is shortened to keep it from hanging downwardly toward the ground, sharp turns would be impossible without breaking the chain or possibly turning the trailer over.

A further disadvantage of the use of chains is that should the ball hitch break loose or become disconnected the chain allows the trailer to weave from side to side, thereby creating the danger of wrecking both the vehicle and trailer as well as creating a hazard to other traffic on the road. The use of a relatively long chain also allows the trailer tongue to engage the ground if it becomes disconnected from the vehicle which may result in capsizing the vehicle or the trailer or both. If the trailer tongue engages the ground, the chain may be broken releasing the trailer out of control on the roadway.

When conventional chains are used as an auxiliary attachment, repairs to the hitch must be made immediately on the spot before the trailer may be towed whether this is convenient or not. On modern streets and expressways in fast moving traffic, it is absolutely necessary that an auxiliary attachment maintain the trailer under control if the hitch becomes disconnected and it is highly desirable to allow mechanical repairs to be delayed temporarily until an access road or service station can be reached.

These and other dangers presented by the currently used types of auxiliary fasteners are so great that some municipalities have outlawed their further use, considering that they create a worse danger than the danger which they are intended to eliminate. The streets and highways are consequently filled with trailers attached to motor vehicles by only the ball hitch with no standby or emergency safety catch to prevent accidents and damage to life and property should the ball hitch fail or be insecurely fastened.

It must also be recognized that a great many persons who tow trailers are not particularly mechanically inclined. Large numbers of boat trailers are towed on public highways. The person towing the boat is usually in a hurry to get to the lake or beach and consequently may fail to connect safety chains or connect them improperly. A primary reason for failing to connect safety chains is because it is often necessary to get down on the ground for making a suitable connection which is undesirable because clothes may be soiled.

Heretofore, no suitable auxiliary safety connection has been provided which maintains control of the trailer if the hitch becomes disconnected while providing the added advantage of being easily connected without the use of wrenches or tools. The convenience of making the safety attachment cannot be over emphasized.

SUMMARY OF INVENTION

I have developed a safety trailer device which may be used with conventional ball-type trailer hitches allowing an auxiliary safety attachment to be made quickly and easily without tools or inconvenience which maintains the towed vehicle under complete control at all times if the ball hitch becomes disconnected.

Generally the invention consists of a C-shaped or channel-shaped member adapted to be secured to the towbar of a vehicle with the ball of a conventional hitch being secured thereto. The safety device consists of a channel member which extends upwardly above the ball allowing an auxiliary connector to be attached between the upper end of the channel member and the trailer tongue.

The auxiliary connector is secured to the motor vehicle at a point axially aligned with the center of the ball of the conventional hitch such that detachment of the ball-type hitch causes the trailer to continue to be connected to the vehicle to a point immediately above the original attachment. Thus, it is not necessary that a substantial amount of slack be provided in the alternate connection to allow sharp turns to be made.

Eliminating the need for slack in the auxiliary attachment allows the trailer to be towed in a straight line even though the hitch becomes detached eliminating the hazards hereinbefore enumerated which result from the use of chains and the like in conventional manner.

It is therefore a primary object of the present invention to provide a safety trailer device wherein control of the trailer is maintained even though the hitch becomes disconnected.

Another object of the invention is to provide a safety trailer device in which the auxiliary connector is maintained in a relatively taut condition at all times.

A further object of the invention is to provide a safety trailer device adapted to secure the trailer tongue to the vehicle above the ground if the hitch becomes disconnected.

A further object of the invention is to provide a safety trailer device which may be connected quickly and easily without the use of tools and without requiring the person making the connection to reach under the vehicle.

A still further object of the invention is to provide a safety trailer device having locking means which prevents a conventional socket from being moved upward a distance sufficient to clear the ball.

A still further object of the invention is to provide a safety trailer device adapted for use on conventional ball-type trailer hitches which may be installed quickly and easily without the use of special tools.

A still further object of the invention is to provide a safety trailer device which is inexpensive making the use thereof economically feasible for all persons.

Other and further objects of the invention will become apparent from the following description considered in connection with the accompanying drawings.

DESCRIPTION OF THE DRAWING

Drawings of two embodiments of the present invention are provided so that the invention may be better and more fully understood, in which:

FIG. I is a fragmentary side elevational view of a trailer hitch incorporating the auxiliary connector;

FIG. II is a perspective view of a first embodiment of the channel member detached from a trailer hitch;

FIG. III is a cross-sectional view taken through the auxiliary connector;

FIG. IV is a side elevational view of a trailer hitch having a modified form of the auxiliary connector mounted thereon;

FIG. V is a cross-sectional view taken substantially along lines V—V of FIG. IV; and FIG. VI is a cross-sectional view taken along lines VI—VI of FIG. V.

FIG. VII is a fragmentary perspective view of the auxiliary connector attached to the bumper of a vehicle.

Numeral references designate like parts throughout the various FIGS. of the drawing.

DESCRIPTION OF A PREFERRED EMBODIMENT

Referring to FIG. I of the drawing, numeral 1 generally designates the auxiliary connector embodying a first form of the present invention connected to a towbar 2 which is welded or otherwise rigidly secured to the rear end of a motor vehicle 3. The tongue 5 of a trailer has a conventional socket 6 secured to the front end thereof for receiving a conventional ball 8 which is secured to towbar 2 by a nut 10 which threadedly engages a spindle 12 as will be hereinafter more fully explained.

Referring to FIG. II, channel member 1 has an upright web 14 and horizontally disposed flange portions 16 and 18 at the lower and upper ends thereof. Lower web 16 has an aperture 20 extending through a central portion thereof for receiving shank 12 of the conventional ball 8.

Upper flange 18 has an aperture 22 extending through a central portion thereof directly above and axially aligned with the center of aperture 20 in the lower flange 16.

Lower flange 16 and upper flange 18 are rigidly connected to the lower and the upper ends respectively of web member 14. Preferably, channel member 1 is cast or formed such that lower flange 16, web member 14 and upper flange 18 comprise a continuous integral strap of steel or other suitable material. However, conventional channel bar stock may be cut to form a narrow strip and apertures 20 and 22 formed in upper and lower flanges.

In the particular embodiment of the invention shown in FIGS. I through III of the drawing, the corners 24 and 26 between flanges 16 and 18 and web 14 are curved to reduce stress concentrations therein.

The radius of curvature of corners 24 and 26 is preferably approximately equal to the width of web 14 and flanges 16 and 18 to minimize bending of the channel members when a load is applied to the upper flange 18.

Referring to FIG. III of the drawing, the auxiliary channel 1 is secured through an aperture 2a in towbar 2 which is secured to a motor vehicle by inserting shank 12 of ball 8 through aperture 20 in lower flange 16 of the channel and through aperture 2a in the towbar. Shank 12 is secured in apertures 20 and 2a by nut 10 and lock washer 30.

Surface 19 on upper flange 18 is semicircular and is concentric with aperture 22.

From the foregoing it should be readily apparent that channel 1 may be secured to a conventional towbar 2 by using a conventional ball 8 such that aperture 22 in the upper flange 18 of auxiliary connector 1 is vertically aligned with the center of the ball 8.

A suitable anchor 34, such as an eye bolt, is secured to trailer tongue 5 in spaced relation from the outer end thereof. Eyebolt 34 may be secured to trailer tongue 5 by inserting the threaded portion of the eye bolt through an aperture in said tongue and securing the eyebolt therein by the use of threaded nuts 36 and 38. Lock washers 40 may be used in combination with nuts 36 and 38 as required.

Anchor 34 has an aperture 34a in the upper end thereof. If an eyebolt is utilized, the hole in the eye of the bolt forms the aperture 34a.

A connector 42 has the opposite ends thereof pivotally secured in aperture 22 in upper flange 18 of auxiliary connector 1 and in aperture 34a of anchor 34 which is secured to the trailer tongue 5.

Means for detachably securing connector 42 in aperture 22, such as a snap hook 44 having a catch 45 which is urged outwardly into a locked position by a spring 46, is provided.

In the embodiment of the invention illustrated in the drawing, connector member 42 is a flexible chain having a snap hook 44 secured to one end and a shackle 48 secured to the other end thereof connected through aperture 34a in eyebolt 34 on trailer tongue 5.

From the foregoing it should be readily apparent that the tongue 5 of the trailer may be connected to the towbar 2 of a motor vehicle by positioning socket 6 around ball 8 in conventional manner. A safety connection is then made by fastening snap hook 44 in aperture 22 forming a second connection between trailer tongue 5 and towbar 2. Since aperture 22 is above and axially aligned with ball 8, the pivot point of connector 42 is directly above the pivot point of socket 6. Therefore, the radial distance from eyebolt 34 to the center of aperture 22 is equal to the radial distance from eyebolt 34 to the center of ball 8. This eliminates the necessity for allowing slack in connector 42 to allow trailer tongue 5 to pivot relative to towbar 2.

DESCRIPTION OF A SECOND EMBODIMENT

A modified form of the invention is illustrated in FIGS. IV—VI of the drawing. In the modified form of the invention, channel member 1' is identical to channel connector 1 hereinbefore described except that corner 24' at the intersection of web 14' and lower flange 16' is a right angle and a second aperture 21' extends through flange 16' between aperture 20' and corner 24'.

Provision of two apertures 20' and 21' provides adjustability of channel member 1', making it adaptable for use with most motor vehicles regardless of the configuration of the rear end 3 thereof and regardless of the distance between the rear of the vehicle and aperture 2a in towbar 2 secured thereon.

As best illustrated in FIG. IV, a bolt 50 may be inserted through aperture 21' in lower flange 16' and through aperture 2a in towbar 2. Bolt 50 is secured therein by a nut 52 and lock washer 54. Spindle 12' of ball 8' is then inserted through aperture 20' in lower flange 16' as hereinbefore described.

An eyebolt 52 extends through and is secured in aperture 22' in flange 18' by nuts 54 and 56. A bushing 53 may be inserted in aperture 22' to take up slack if the shank 60 is not the same diameter as aperture 22'. At least one lock washer 58 is provided for use in conjunction with nuts 54 and 56 to prevent loosening thereof on threaded shank 60 of eyebolt 52.

The lower end 62 of eyebolt 52 is adjusted to a position above socket 6' to prevent upward movement of said socket a distance sufficient to disengage ball 8 without first removing the eyebolt 52. Nuts 54 and 56 may be adjusted such that the lower end 62 of eyebolt 52 is positioned close to the top of socket 6' after the socket has been placed on the ball 8 and securely fastened thereto. Vertical immobility of the tongue is obtained so that even if the socket becomes loose around ball 8 the shank 60 of eyebolt 52 prevents upward movement thereof.

Snap hook 44 on the end of connector 42 may be snapped through aperture 52a of eyebolt 52 thereby securing safety connector 42 to auxiliary channel connector 1'.

Channel members 1 and 1' are capable of being installed on all existing ball-type hitches currently in use on motor vehicles to add safety to their use and may be transferred from vehicle to vehicle. Snap hook 44 may be secured in aperture 22 or aperture 52a without reaching under the vehicle and without requiring special tools.

Besides being convenient to connect and disconnect safety connector 42 accomplishes the objects of the invention hereinbefore enumerated. Being attached above ball 8 connector 42 is relatively short and a large amount of slack is not required for turning corners. Should socket 6 become disengaged from ball 8 of a trailer hitch, the trailer tongue 5 will be held above the ground, eliminating the possibility that the leading end of tongue 5 will dig into the ground. If the trailer is improperly loaded such that the greater weight of the load is to the rear of the axle of the trailer, connector 42 limits upward movement of tongue 5.

It should also be noted that since connector 42 extends between trailer tongue 5 and a point 22 directly above ball 8 the trailer may be towed in a straight line under complete control even though socket 6 disengages ball 8.

The two embodiments of the invention hereinbefore described relate to an auxiliary connector which may be attached to a conventional towbar 2 by the use of a bolt 50 or by spindle 12 of a conventional ball 8. It should be noted, however, that a towbar 2 may be constructed with an upturned web portion and a horizontally disposed flange portion which is integrally formed or cast thereon or channel member 1 or 1' may be welded or otherwise permanently fixed to a towbar 2.

The arcuate or channel member 1 may be attached to the rear bumper of a vehicle which does not have a towbar mounted thereon.

Referring to FIG. VII, it should be noted that means for securing the arcuate member 1 to the bumper 3a of a vehicle includes U-bolts 70 secured to a chain or other flexible member 72 extending around the bumper 3a. The legs of U-bolt 70 extend along opposite sides of web 14 of the arcuate member 1. A strap 74 having apertures 76 extending therethrough receive the threaded ends of bolts 70. Nuts 78 may be tightened to rigidly secure arcuate member 1 to the bumper 3a.

A pad 80 of rubber, wood, plastic or other material may be positioned between arcuate member 1 and bumper 3a to prevent damage to the surface finish of the bumper and to align aperture 22 vertically above aperture 20.

It should be appreciated that clamps or bolts may extend around or through a portion of arcuate member 1 or other means may be employed for securing arcuate member 1 to the vehicle 3.

I claim:

1. In a trailer hitch for attaching the tongue of a trailer to a towing vehicle, a channel shaped member having a vertical web portion and upper and lower flanges horizontally disposed on the upper and lower edges of the web portion, each flange being provided with an aperture therethrough, the said apertures being vertically aligned; a ball-type attachment member attached in the aperture in the lower flange; means for securing the channel-shaped member to the towing vehicle; a flexible connector member attached to the tongue of the trailer; and a disengageable attachment member on the end of the connector attachable to the aperture in the upper flange, said attachment member being arranged to pivot about a point in vertical alignment with the ball.

2. The combination called for in claim 1 with the addition of a second aperture in the lower flange between the web and the first named aperture for receiving a bolt to secure the channel shaped member to a towbar.

3. In a hitch for joining the tongue of a trailer to a towbar secured to the rear end of a vehicle, a ball-and-socket connector pivotally connecting the trailer tongue with the towbar; an upright member; means for securing the upright member to the towbar; a horizontally disposed member on the upper end of the upright member constructed and arranged to extend over the ball and socket connector, said horizontally disposed member having an aperture therethrough positioned vertically above the ball-and-socket connector and adapted to receive a downwardly projecting shank such that the shank is positionable adjacent the socket to prevent disengagement of the socket from the ball; a flexible connector extending between the horizontally disposed member and the trailer tongue; and disengageable means to pivotally connect the flexible connector to the horizontally disposed member vertically above the ball-and-socket connector, the flexible connector being substantially shorter in length than the trailer tongue.

4. The combination called for in claim 3 wherein the upright member is the web of a channel shaped member; the horizontally disposed member is an upper flange of the channel-shaped member; and the means for securing the upright member to the towbar includes a lower flange on the channel-shaped member.

5. The combination called for in claim 4 wherein the means for securing the channel-shaped member to the towbar comprises an aperture in the lower flange and a bolt insertable through the aperture to secure the channel-shaped-member to the towbar.

6. The combination called for in claim 3 with the addition of anchor means comprising an eye secured to the trailer tongue and means for securing one end of the flexible connector to the anchor.

7. A trailer hitch comprising an arcuate member having an aperture extending therethrough; a ball having a threaded shank thereon secured to the arcuate member in spaced-apart relation from the aperture; means for pivotally connecting a trailer tongue to the ball; a flexible connector; means for pivotally securing the connector to the aperture; means for pivotally securing the connector to the trailer tongue; and means for securing the arcuate member to a vehicle adapted to cause the aperture to be positioned vertically over the ball.

8. In a hitch for joining the tongue of a trailer to a towbar secured to the rear of a vehicle, a channel-shaped member having upper and lower flanges secured to an upright web, said flanges having vertically aligned apertures extending through a central portion thereof, said channel-shaped member being connectable to the vehicle; a ball having a bolt secured through the aperture in the lower flange; a socket on the end of the trailer tongue for receiving the ball; a threaded eyebolt extending through the aperture in the upper flange and a nut to secure the eyebolt in the said aperture such that the lower end of the eyebolt is positionable over the socket, preventing upward movement of the socket to disengage the ball; an elongated connector member, means for connecting one end of the connector to the eye of the eyebolt; and means to attach the other end of the connector to the trailer tongue.

9. An attachment for use with a trailer hitch having a ball-and-socket connection secured to the hitch, said attachment comprising, an arcuate member having an aperture therein; an inwardly projecting shank extending downwardly from and movable relative to the arcuate member through said aperture and positionable over the socket to prevent disengagement of the socket from the ball; and means for securing the arcuate member relative to the ball.

10. The combination called for in claim 9 with the addition of connector means secured to the trailer tongue; and disengageable attachment means for securing the connector to the arcuate member.

11. The combination called for in claim 10 wherein the shank has an upwardly extending portion and the disengageable attachment means is connectable to the upwardly extending portion of the shank.

12. In a trailer hitch for attaching the tongue of a trailer to a towing vehicle, a channel-shaped member having a vertical web portion and upper and lower flanges horizontally disposed on the upper and lower edges of the web portion, each flange being provided with an aperture therethrough, the said apertures being vertically aligned, a ball-type attachment member attached in the aperture in the lower flange; means for securing the channel-shaped member to the towing vehicle; an eyebolt having a threaded shank and an eye on the upper end thereof, the shank of the eyebolt extending through the aperture in the upper flange and the lower end of the shank extending downwardly from the upper flange toward the aperture in the lower flange; threaded means to secure the shank relative to the upper flange; a connector member attached to the tongue; and a disengageable attachment member on the end of the connector member attachable to the eye in the eyebolt, said attachment member being arranged to pivot about a point in vertical alignment with the ball.